(12) United States Patent
Waide

(10) Patent No.: US 7,942,366 B2
(45) Date of Patent: May 17, 2011

(54) AIRCRAFT LANDING GEAR WITH INTEGRATED EXTENSION, RETRACTION, AND LEVELING FEATURE

(75) Inventor: William Martin Waide, Adelanto, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 461 days.

(21) Appl. No.: 11/473,977

(22) Filed: Jun. 23, 2006

(65) Prior Publication Data

US 2007/0205326 A1 Sep. 6, 2007

Related U.S. Application Data

(60) Provisional application No. 60/693,955, filed on Jun. 23, 2005.

(51) Int. Cl.
*B64C 25/10* (2006.01)
*B64C 25/26* (2006.01)

(52) U.S. Cl. ............................... 244/102 SS; 244/102 R
(58) Field of Classification Search .................... 74/841, 74/89.23; 244/102 R, 102 A, 102 SS
See application file for complete search history.

(56) References Cited

U.S. PATENT DOCUMENTS

| | | | |
|---|---|---|---|
| 2,015,920 A | 10/1935 | Canney | |
| 2,165,465 A | 7/1939 | Ehrhardt et al. | |
| 2,387,713 A * | 10/1945 | Bradford | 475/2 |
| 2,459,982 A | 1/1949 | Wells | |
| 3,131,891 A | 5/1964 | Lallemant | |
| 4,526,053 A * | 7/1985 | Carson | 74/424.92 |
| 6,349,901 B1 * | 2/2002 | Grossman | 244/102 R |
| 2007/0057118 A1 * | 3/2007 | Bietenhader | 244/102 R |

* cited by examiner

*Primary Examiner* — Tien Dinh
(74) *Attorney, Agent, or Firm* — Fish & Associates, PC

(57) ABSTRACT

Electrically controlled and/or actuated landing gear mechanisms are presented that allow for adjustment of aircraft attitude on the ground as well as for retraction and extension of the landing gear in a single unit. Most preferably, the electric actuator is positioned within the diameter of the strut to thereby form a compact and load bearing structure.

15 Claims, 3 Drawing Sheets

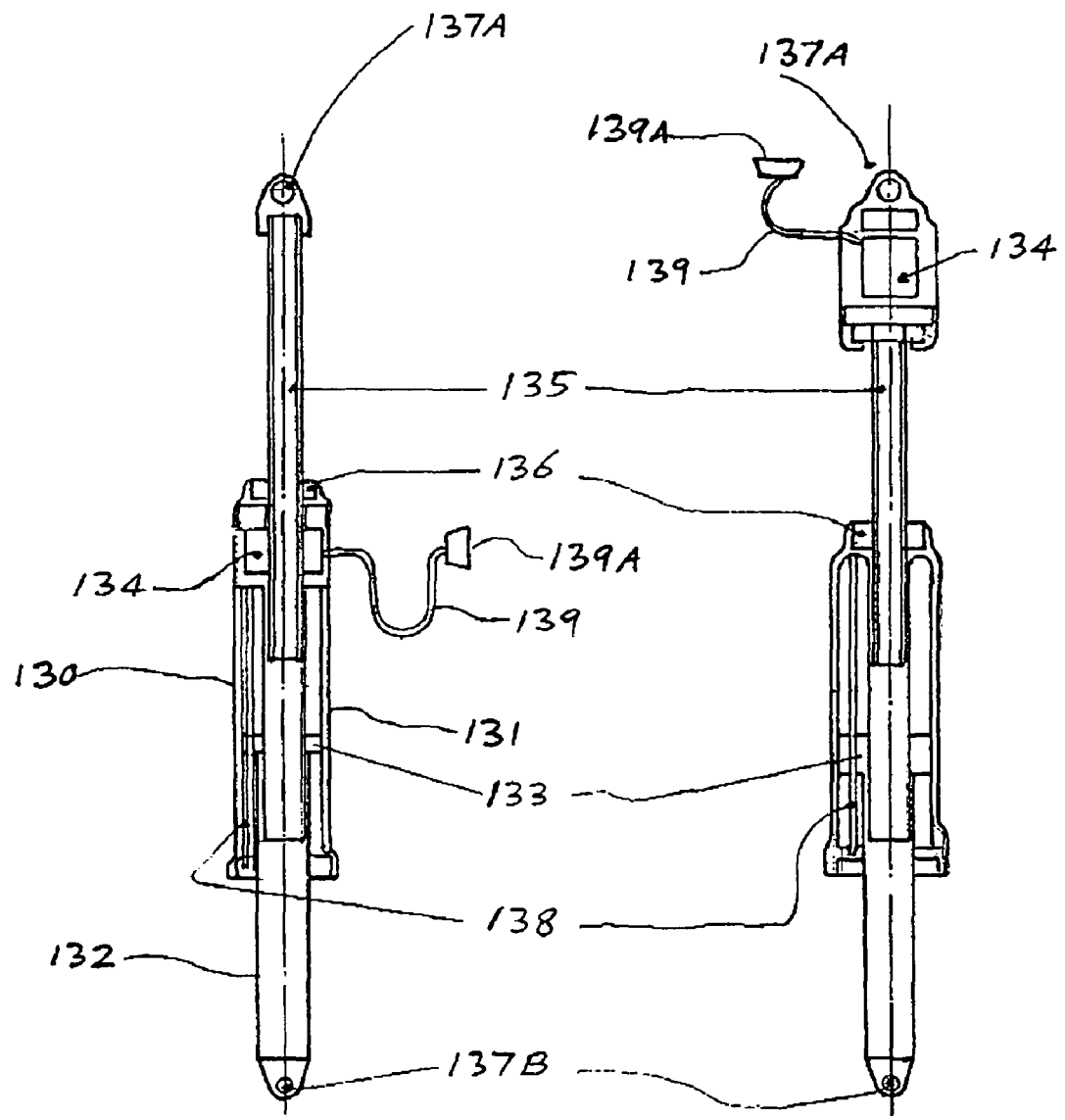

AIRCRAFT LANDING GEAR WITH INTEGRATED EXTENSION, RETRACTION, AND LEVELING FEATURE

This application claims the benefit of our U.S. provisional patent application with the Ser. No. 60/693,955, which was filed Jun. 23, 2005.

FIELD OF THE INVENTION

The field of the invention relates to the landing gear of aircraft.

BACKGROUND OF THE INVENTION

Transport aircraft that are particularly designed for STOL (Short Take-Off and Landing) operations share certain landing gear characteristics because, by their very nature, short runways often have an unprepared surface, are uneven or sloping and have poor facilities for the loading and unloading of the aircraft. Rotorcraft (VTOL—Vertical Take-Off and Landing) operators face even more severe constraints regarding the landing area terrain. The conditions of use of the landing gear establish the design criteria, namely, rugged construction with landing loads being transferred to the primary aircraft structure, wheels of large diameter with generous tire sections not operating at high pressure and large energy absorption to retard the aircraft's potentially high descent rates.

In terms of aircraft utility, however, another requirement applies which relates to the loading and unloading of cargo or vehicles which have dimensions that closely match the door and unloading ramp opening sizes. The pitch angle of the aircraft, the roll angle and height above the local ground surface is preferably adjusted to maximize the headroom height above the loading ramp, or, alternatively, to reduce the ramp angle for vehicle movements in and out of the cargo bay.

A recurring problem in the manipulation of aircraft attitude on the ground (often referred to as the "kneeling" function) is that the systems are typically hydraulic, and that hydraulic power and its controls are heavy, expensive, and have imperfect reliability. The same is true for the retraction and extension of the landing gear. More recently, designers and operators of new aircraft are now favoring all-electric systems for reasons of ease of control, multiple redundancy, fail-operational characteristics and much improved power to weight ratio.

However, while certain advantages are readily achieved using electric attitude control, landing gear using such control, and especially landing gear for STOL and VTOL aircraft has not been appreciated. Therefore, there is still a need for improved landing gear using electric attitude control for STOL and VTOL aircraft.

SUMMARY OF THE INVENTION

The inventive subject matter provides devices and methods in which an integrated electrically-positioned landing gear retraction, suspension, and attitude adjustment mechanism are made possible. Most preferably, contemplated devices combine the above three functions into a single assembly using a single attachment to the wheel assembly, and a single attachment to aircraft structure. As one consequence, contemplated devices and methods save a substantial amount of weight and provide improved failsafe operation. Moreover, in particularly preferred aspects of the inventive subject matter, efficiency of electric operation is at least 90%, and more typically at least 95%, which allows further reduction of motor size.

In understanding various advantages over the prior art, it is helpful to differentiate the suspension and damping functions of a suspension strut from the retraction and positioning functions. There is no doubt that an "oleo", consisting of a piston traveling inside a cylinder which is filled with a gas/oil combination, is an effective combination of spring and damper unit, and this part of the system is unchanged in the present invention.

What is changed is the attachment and integration of an electrically-driven extension of the suspension unit, which is capable of effecting substantial changes of length to the unit, and to do so under load. This approach has particular application to transport aircraft or helicopters, each of which have sufficient linear height within their structures to accommodate a single, co-axial combined oleo/actuator unit. Among other things, contemplated configurations reduce weight and simplify installation when applied to STOL and VTOL landing gear. In addition, it is contemplated that other mechanical arrangements of the combined strut could be used advantageously in aircraft with differing structural layouts.

Various objects, features, aspects and advantages of the present invention will become more apparent from the following detailed description of preferred embodiments of the invention.

BRIEF DESCRIPTION OF THE DRAWING

FIG. 5 is a vertical cross-section of the strut of FIG. 1 showing the internal construction of the strut, and illustrating the use made of internal volume.

FIG. 6 is a vertical cross-section of an alternative strut with a revised electric motor location, which permits a non-extending electric wiring connection to the motor.

DETAILED DESCRIPTION

The inventor has discovered that an electrically controlled and/or actuated landing gear mechanism can be constructed for STOL and VTOL aircraft in which the mechanism allows for adjustment of aircraft attitude on the ground as well as for retraction and extension of the landing gear in a single unit. Most preferably, contemplated mechanisms integrate the electric extension and/or retraction with a gas/oil spring/damper unit. Thus, it is now possible to provide a typically self-contained unit that requires only two mountings (to the wheel assembly and to the fuselage) and an electrical connection to the parent vehicle. In an especially preferred aspect, these and other advantages are achieved by packaging the leadscrew (electric actuator) within the piston rod of the strut (gas/oil spring/damper unit).

The sum of all mechanical lengths that do not contribute to travel is referred to as the dead length. Closed length is dead length plus travel, open length is dead length plus two times travel. In view of the long travel required, it is important that the total end-to-end dimensions of the parts that contribute to dead length are controlled at the design stage.

Figure 1:
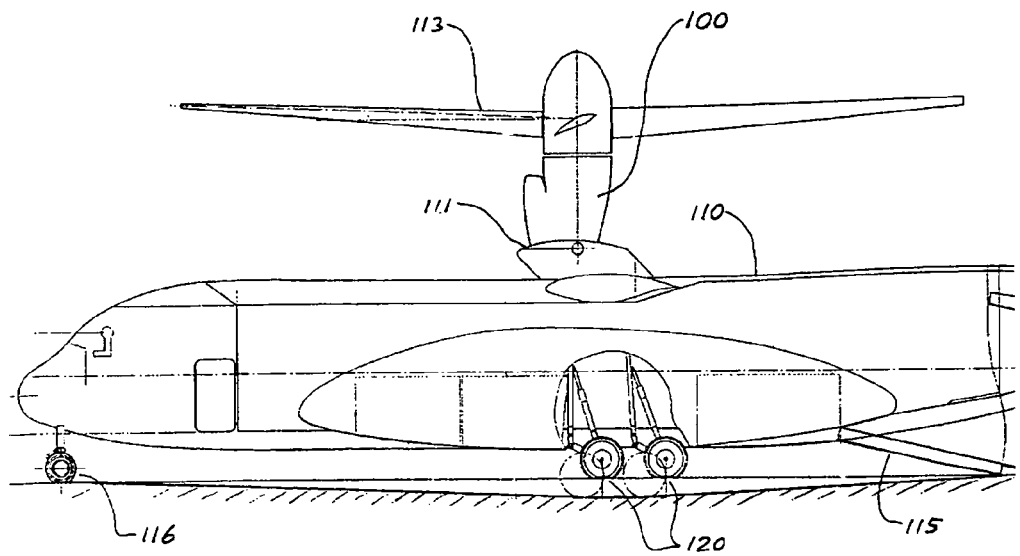
FIG. 1 is a side view of a rotorcraft having a suspension system that includes a length adjustable strut.
Figure 2:
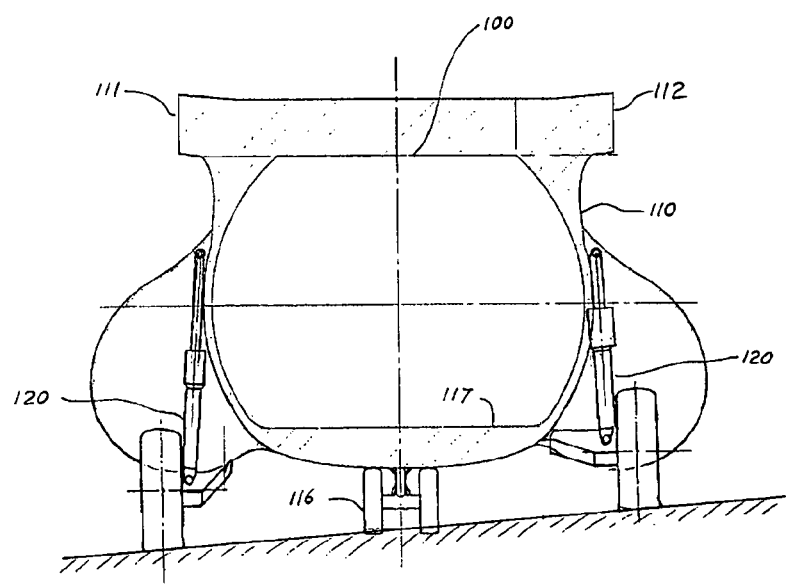
FIG. 2 is a cross-section of the rotorcraft of FIG. 1 about the main gear.
Figure 3:
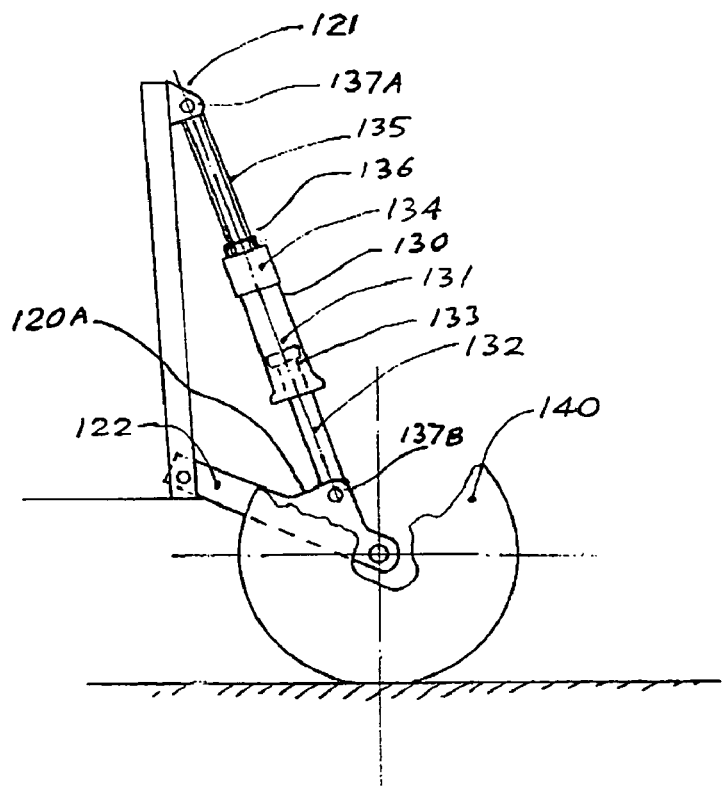
FIG. 3 is a side view of the left side main landing gear of FIG. 1, showing the combined strut, and attachment structure.

In FIG. 1, a rotorcraft 100 generally includes a fuselarge 110, a left wing 111, a rotor 113, a rear loading ramp 115, a nose gear 116, and main landing gear 120. The main landing gear 120 is illustrated in extended position. In FIG. 2 the rotorcraft 100 depicts the fuselage 110, both left wing 111 and right wing 112, a nose gear 116, and main landing gear 120. Also shown is the cargo floor 117. In FIG. 3, the left landing gear 120A generally includes aircraft structure 121, a trailing-arm suspension element 122, a strut 130, and a wheel 140. The strut 130 generally comprises a strut cylinder 131, rod 132, piston 133, actuator motor 134, actuator lead screw 135, nut 136, pivots 137A and 137B. Most preferably, the pivots cooperate to limit transmission of non-axial forces, for example, via spherical geometry and corresponding fit to the fuselage, or otherwise mating engagement with fixed portions on the fuselage.

Figure 4:
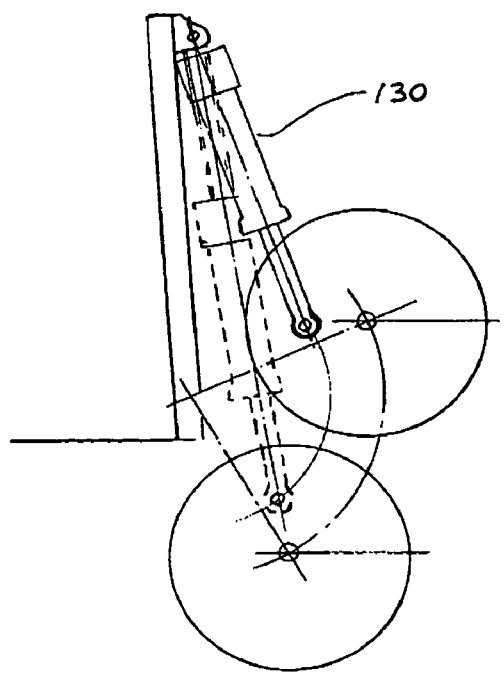
FIG. 4 is a side view of the left side main landing gear of FIG. 3, showing fully retracted and fully extended configurations.

In FIG. 4, strut 130 is shown in retracted configuration in solid line, and in fully extended configuration in dotted lines, and fully collapsed positions of the combined strut unit. It will be appreciated that internal space should be provided to accept all the components in their collapsed locations. In FIG. 5 the strut 130 again includes the strut cylinder 131, rod 132, piston 133, actuator motor 134, actuator lead screw 135, nut 136, pivots 137A and 137B. Also shown are anti-rotation rods 138. Wire 139 carries power and control to the motor 134 from a wire mount 139A. Most typically, both power and control information is relayed via the wire 139 and wire mount 139A. Where desirable, a position feedback detector is preferably included that provides information regarding the position of the strut (e.g., coupled to the motor and counting motor revolutions, or electromagnetic indicator, not shown). In FIG. 6, and alternative configuration of strut 130A positions the motor 134 near the top pivot 137A. Such a configuration allows the power and control wiring to be stationary relative to airframe.

FIG. 5 shows the overlapping of internal components, in that portions of the electric actuator and portions of the gas/oil strut occupy the same length element. FIG. 5 also depicts the main components, the strut body, piston rod, and piston, the motor of the electric actuator, the planetary roller nuts driven by a gearset, a thrust bearing and the leadscrew. A particularly length-efficient design, as illustrated, makes use of a "pancake" style electric motor with an internal diameter large enough to accommodate the leadscrew. The strut piston rod is therefore preferably sufficiently hollow to accommodate at least some, and more typically all of the included parts. The strut piston rod is also preferably sealed against an internal tube, co-axial with the strut components, and of sufficient diameter to accommodate the leadscrew. Thus actuator and strut parts "overlap" in the same length element of the entire strut.

Attention is drawn to the functional details of the planetary roller nut and leadscrew. In particular, the leadscrew-to-nut rotating interface is preferably sealed to prevent dirt entering the actuator. Also, the planetary roller nut devices combine high axial load carrying capacity with high efficiency, in the order of at least 90%, and more typically at least 95%. Among certain other suitable options, it is generally preferred that the lead screw comprises a planetary roller screw, most preferably having a helix angle and an angle of friction that is less than the helix angle. Such combination of properties allows a high performance electric motor (e.g., high-voltage, permanent magnet, brushless motor) to raise the loaded aircraft. Taking a nominal case of a 30,000 lb. load per main landing gear wheel and an elevation rate of 0.8 inches per second, it should be noted that at this high efficiency the motor power required is calculated to be less than 3 kW. The size of such a motor (approximately 6 inches in diameter and 4 inches long) is thus fully compatible with the proportions of the strut.

There are yet other advantages to the configurations according to the inventive subject matter. Since torque from the motor is internally reacted between the strut housing and the piston in the local oil-wetted environment, the above-mentioned high mechanical efficiency permits the "back-driving" or free extension of the unit without electrical power, which is a safe, emergency default condition which would be employed if there is an electrical power failure. The potential energy needed to "back-drive" the system comes from the combined weight of the wheel, brake, tire and all unsprung parts of the landing gear. On reaching full extension, a mechanical latch will prevent leadscrew reversal and subsequent lowering of the aircraft after landing.

Struts of this type loaded in compression require careful attention to the buckling loads, and hence the bending stiffness of all the construction elements. But it has now been appreciated that for a device of this type, where a life of 10,000 extension and retraction cycles would constitute one lifetime, it is permissible to carry side loads through the planetary roller nuts spaced sufficiently far apart to resist bending. The piston and rod support bearings of the gas/oil strut are also spaced apart at full extension to resist bending.

An alternative embodiment of the design is shown in FIG. 6, wherein the actuator motor is located at the upper, mounting, end of the strut, giving the useful benefit that the electric wiring does not have to move during the extension/retraction cycles. This re-arrangement of the major elements of the design does not require additional components, but nevertheless produces an increased dead length because the leadscrew no longer passes through the electric motor.

Thus, specific embodiments and applications of aircraft landing gear with integrated extension, retraction, and leveling features have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A landing gear assembly for raising and lowering a wheel assembly of an aircraft having an airframe, comprising:
   a strut and a trailing arm;
   the strut having (a) a length adjuster that connects to the airframe via a first pivot, and (b) a spring damper that connects to the trailing arm via a second pivot;
   a motor disposed between the first and second pivots and operable to drive the length adjuster; and
   the trailing arm connecting the wheel assembly to the airframe via a third pivot, such that the first, second and third pivots are the only pivots needed to raise and lower the wheel assembly, wherein the trailing arm further comprising a straight portion, the trailing arm having one end connected to the third pivot and a second end farthest from the third pivot being attached to the wheel assembly.

2. The landing gear assembly of claim 1, wherein the strut further comprises first and second telescoping support members.

3. The landing gear assembly of claim 2, wherein the support members are coaxial.

4. The landing gear assembly of claim 2, wherein one of the support members comprises a screw rod, and another of the support members comprises a piston tube, so arranged that the rod can enter the tube.

5. The landing gear assembly of claim 2, wherein one of the support members cooperate such that a maximum travel length of the strut is greater than a closed length of the strut.

6. The landing gear assembly of claim 1, wherein the spring damper comprises a gas/oil shock absorber.

7. The landing gear assembly of claim 1, wherein the motor is electric.

8. The landing gear assembly of claim 1, wherein the length adjuster comprises a lead screw and nut.

9. The landing gear assembly of claim 8, wherein the lead screw comprises a planetary roller screw.

10. The landing gear assembly of claim 9, wherein the planetary roller screw has a helix angle, and an angle of friction that is less than the helix angle.

11. The landing gear assembly of claim 1, wherein the first and second pivots cooperate to limit transmission of non-axial forces from the wheel assembly to the airframe.

12. The landing gear assembly of claim 1, further comprising and a position feedback detector that provides information regarding a position of the strut.

13. A The landing gear assembly of claim 1, further comprising a signal connector that carries both power and control information.

14. The landing gear assembly of claim 1, wherein the motor is disposed at an upper end of the strut.

15. The landing gear assembly of claim 1, further comprising a housing for the spring damper, and a nut at the upper end of the housing that cooperates with the motor and length adjuster to raise and lower the wheel assembly.

* * * * *